INVENTORS
AUGUSTE LOUIS MARIE ANTOINE ROUY
ALEX J. WEINSTEIN

BY

ATTORNEY

INVENTORS
AUGUSTE LOUIS MARIE ANTOINE ROUY
ALEX J. WEINSTEIN
BY:
ATTORNEY.

United States Patent Office 3,396,627
Patented Aug. 13, 1968

3,396,627
METHOD AND DEVICE FOR MEASURING SURFACE ROUGHNESS
Auguste Louis Marie Antoine Rouy, Scarsdale, and Alex J. Weinstein, Croton-on-Hudson, N.Y., assignors to The Ednalite Corporation, Peekskill, N.Y., a corporation of New York
Filed Apr. 9, 1965, Ser. No. 446,809
10 Claims. (Cl. 88—14)

This invention relates generally to the measurement of surface roughness.

The measurement of surface roughness has long presented serious difficulties, and, with recent advances in technology which frequently require relatively precise measurement of the roughness of surfaces, both for experimental purposes in laboratories and for inspection purposes in manufacturing facilities, it is imperative that those difficulties in effecting surface roughness measurements be overcome. Heretofore, precise measurements of surface roughness have been obtainable only under severe laboratory conditions through the use of expensive equipment operated by trained personnel, and only gross evaluations of surface roughness have been obtainable under manufacturing or production conditions.

The measurement of surface roughness has usually been effected by the use of interference microscopes, recording profilometers, or gaged surface specimens. Although interference microscopes provide absolute measurements of the surface geometry, such instruments are expensive and cannot be practically employed outside a specialized laboratory. Although recording profilometers are more practical to use, such instruments furnish valid data as to the surface geometry only along a line or locus of the exploring point. Further, the data obtained by a recording profilometer is accurate only so long as the configuration of the exploring point is known and remains constant, and only so long as the surface being measured is of sufficient hardness to avoid indentation or deformation by the exploring point. In the use of gaged surface specimens which have precisely known degrees of surface roughness, a visual comparison is made of the appearance of the surface to be measured with the appearance of the surfaces of the specimens, and it is assumed that the known surface roughness of the specimen having the closest appearance to that of the surface being measured will correspond to, or indicate the roughness of the latter. However, it will be apparent that the use of gaged surface specimens, as described, is a subjective test of surface roughness and requires the services of skilled and experienced personnel if any degree of reliability is to be obtained.

Accordingly, it is an object of this invention to provide a method by which relatively unskilled personnel can accurately and conveniently measure the roughness of a surface, which method can be readily employed either under laboratory or production conditions.

Another object is to provide a simple and inexpensive device operable by relatively unskilled personnel for accurately measuring surface roughness.

In accordance with an aspect of this invention, the roughness of a surface is measured by viewing, along a fixed line of sight, images successively formed by reflection onto the surface to be measured, at an angle of incidence greater than 45 degrees, preferably between approximately 50 degrees and 75 degrees, of a series of targets. The several targets consist of spaced lines of different size, thickness and spacing having correspondence to varying degrees of surface roughness and may, for example, take the form of National Bureau of Standards Resolving Power Charts, so that the target or chart having the greatest number of lines per unit dimension which can be clearly seen or resolved in an image thereof formed by reflection onto the surface to be measured indicates the roughness of such surface, and more particularly indicates the root mean square value of the surface geometry which is accepted as a standard measure of roughness.

Since the naked human eye has a maximum resolving power of only about five lines per millimeter, the reflected images of the targets or charts are preferably viewed through magnifying lens means which increase the viewer's resolving power to about twenty lines per millimeter and, in that case, each target is held at an angle to the surface being measured which is smaller than the angle of incidence at which the target is reflected onto the surface, thereby to avoid the viewing of an image of the surface in addition to the desired image of the target.

A device for measuring the roughness of a surface in accordance with this invention comprises, as its essential components, at least one planar target member having one or more targets or groups of spaced lines thereon and being carried by support means, which may rest against the surface to be measured, and is adapted to hold the target member adjacent such surface in a plane at an acute angle relative to the surface, and sighting means also carried by the support means and establishing a fixed line of sight of the image of each target or group of lines formed by reflection thereof onto the surface to be measured at an angle of incidence greater than 45 degrees.

In preferred embodiments of this invention, each target member has a plurality of targets or groups of lines thereon, with the lines in each group being of different size, spacing and thickness so as to have correspondence to varying degrees of surface roughness, and the target member is movable relative to the support means so as to select the group of spaced lines brought to a viewing position at which the reflected image thereof is in the fixed line of sight established by the sighting means.

In order to increase the visibility of the image of each target or group of lines formed by reflection thereof onto the surface to be measured, the target member may be illuminated, preferably by back illumination, in which case the target member is formed of a light transmitting material.

In preferred embodiments of this invention, the sighting means of the device for measuring the roughness of a surface includes a sight tube carried by the support means so as to extend at right angles to the surface for convenient viewing and a mirror or other reflecting element positioned between the sight tube and the surface so as to bend or angle the line of sight from the surface into the axis of the sight tube. Where a magnifying lens is provided for increasing the resolving power of the viewer's eye, such lens may be conveniently mounted adjacent the end of the sight tube closest to the reflecting mirror.

The above, and other objects, features and advantages of this invention, will be apparent in the following detailed description of illustrative embodiments thereof which is to be read in connection with the accompanying drawings, wherein.

A surface may be generated by cutting, milling, grinding, burnishing, buffing, lapping, polishing or any other known technique. Although these known surface generating techniques subject the surface material to different actions, such as, shearing, dislocations, thermal viscous flow and the like, which impart a characteristic appearance to the generated surface, it is a fact that any such surface is made up of a large number of minute, substantially plane surfaces in various orientations and ranging in extent from macro- to sub-micro dimensions. This is particularly true in the case of metals and metal alloys which have generally polycrystalline structures and therefore cleave readily along their main crystal planes. The degree of roughness of a surface is characterized by the percentage of the macro- to sub-micro planar elements of the surface which are disposed parallel to each other. In the case of a perfect geometric surface, that is, a perfect reflecting mirror, all the elements of the surface are in the same plane, whereas, as the roughness of the surface is increased, the percentage of the surface elements lying in parallel planes is progressively decreased.

With the above characteristics of a surface in mind, the method and device embodying this invention make use of the surface to be measured as a mirror or reflecting element in successively viewing targets having lines of different size, spacing and thickness, and the degradation of the resolving power as a function of the roughness of the surface is observed and measured.

Figure 1:
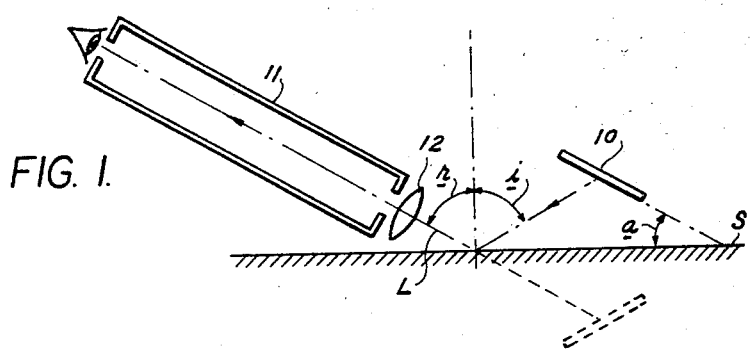
FIG. 1 is a diagrammatic view illustrating the principle of the measurement of surface roughness in accordance with this invention.

More specifically, in accordance with the invention as illustrated diagrammatically on FIG. 1, a planar target member 10 having at least one target or group of lines thereon is positioned adjacent the surface S to be measured so as to lie in a plane at an acute angle $a$ with respect to such surface, and the image of the target or group of lines formed by reflection onto the surface S is viewed along a fixed line of sight L, for example, as defined by a sight tube 11, positioned so that the angle of incidence $i$ and the angle of reflection $r$ are each greater than 45 degrees, and preferably in the range between approximately 50 degrees and 75 degrees.

Figure 2:
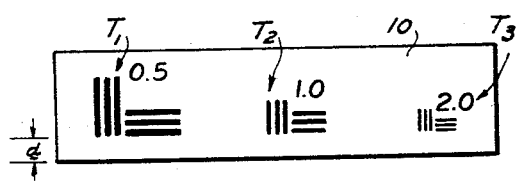
FIG. 2 is a plan view of a target member used in connection with this invention.

As shown on FIG. 2, each target member 10 may have a plurality of targets $T_1$, $T_2$ and $T_3$ thereon, with each target consisting of a group of lines of size, thickness and spacing differing from the corresponding dimensions of the lines in the other targets. The targets, as shown, may be similar to the resolving power charts of the National Bureau of Standards with different numbers of lines per unit dimension extending in directions at right angles to each other. In the example shown on FIG. 2, target $T_1$ may have 0.5 line per millimeter measured across the longitudinal direction of the lines in question, target $T_2$ may have one line per millimeter measured in the same direction, and target $T_3$ may have two lines per millimeter measured in the same direction. Similar targets may be provided on other target members with progressively varying numbers of lines per unit dimension.

The roughness of the surface S will determine the extent to which the lines of the targets having progressively increasing number of lines per millimeter can be resolved or clearly seen when viewed by reflection onto the surface S along the line of sight L. If the surface S is relatively rough, that is, has a relatively high RMS or root mean square value, which is a generally accepted measurement of surface roughness, then the maximum number of lines per millimeter that can be clearly resolved or seen in the image of the corresponding target reflected onto the surface S will be relatively small. On the other hand, if the surface S is smooth, that is, has a relatively small RMS value, then the maximum number of lines per millimeter that can be resolved or clearly seen in the image of the corresponding target reflected onto the surface will be relatively large.

Figure 3:
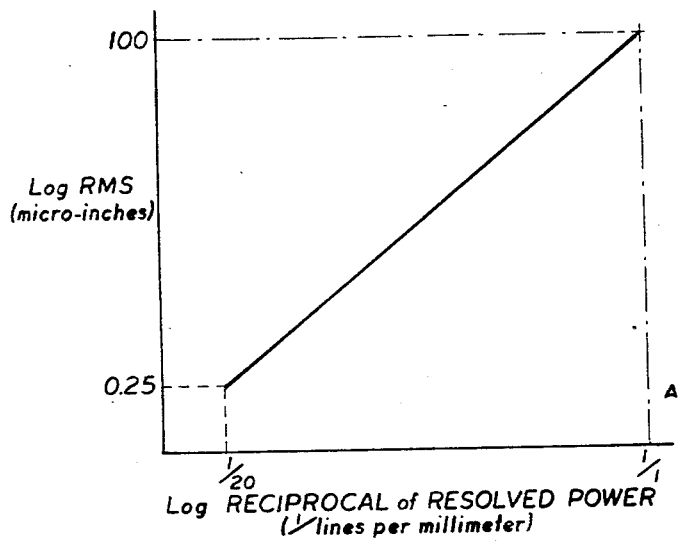
FIG. 3 is a graph showing the relation of surface roughness to the power to resolve images of lined targets reflected onto the surface.

In fact, it has been found, as indicated graphically on FIG. 3, that the logarithm of the RMS value (in micro-inches) of the surface being measured is a linear function of the logarithm of the reciprocal of the resolved power, that is, the reciprocal of the maximum number of lines per millimeter that can be clearly resolved or seen in the image of the corresponding target reflected onto the surface. By way of example, a surface having an RMS value of 0.25 micro-inch is capable of reflecting an image of a target having twenty lines per millimeter in a manner to permit such lines to be resolved or clearly seen. On the other hand, a surface having an RMS value of 100 micro-inches prevents the clear viewing or resolution of the reflected image of a target having more than one line per millimeter.

In view of the above described relationship between the RMS value of a surface and the number of lines per unit dimension in a target that may be resolved or clearly seen when viewed by reflection onto the surface, it is possible to establish a calibration between the number of lines per unit dimension in each target and the RMS value or roughness of a surface that can reflect an image of the target without degrading the resolution to the extent where the lines cannot be clearly seen. Having established such a calibration, it is only necessary to view the targets successively, in the manner indicated diagrammatically on FIG. 1, with progressively increasing numbers of lines per unit dimension in the successively viewed targets, and to select that target having the maximum number of lines per unit dimension that can be clearly seen or resolved by reflection onto the surface S, which selected target is an accurate indication of the roughness of the surface being measured.

Where the target member 10 has several targets thereon, as indicated on FIG. 2, the target member may be displaced so as to bring the reflected images of the targets successively into the line of sight L. Where the full range of targets is provided on several target members, the target members are successively interchanged until the target having the maximum number of lines per unit dimension that can be clearly seen or resolved is in the line of sight.

Since the resolving power of the human eye is only approximately five lines per millimeter, which corresponds to a surface roughness RMS value of 5 micro-inches, the reflected images of the targets brought successively into the line of sight L are preferably viewed through a magnifying lens 12 interposed in the line of sight and designed so that the viewer can conveniently resolve at least twenty lines per millimeter, thereby permitting the measurement of surfaces having an RMS value as small as 0.25 micro-inch. When such lens is employed for increasing the viewer's resolving power, the angle $a$ between the plane of the target member 10 and the surface S being measured is preferably less than, for example, by five to ten degrees, the angle of incidence. When the angle $a$ is less than the angle of incidence $i$, as indicated above, the viewer sees only the image of the target formed by reflection onto the surface S, and the surface S is itself not seen and therefore does not interfere with resolution of the image.

Figure 4:
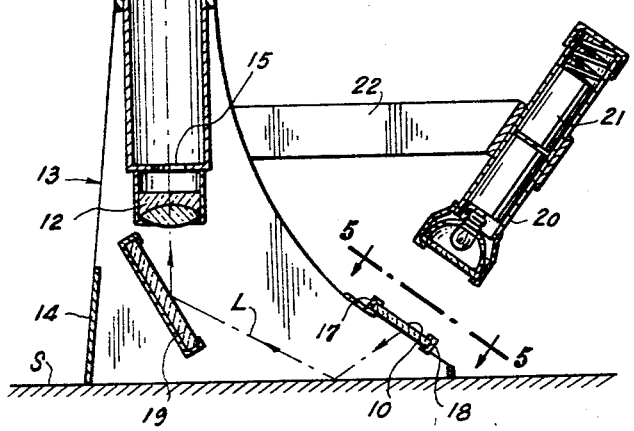
FIG. 4 is a vertical sectional view of a practical embodiment of a device for measuring surface roughness in accordance with this invention.

Referring now to FIG. 4, it will be seen that one practical embodiment of a device for measuring the roughness of a surface in accordance with this invention comprises a frame or support 13 having a base portion 14 which is adapted to rest against the surface S to be measured.

The sight tube 11 is mounted in support 13 so as to extend at right angles to the surface S for convenient viewing through the sight tube. The magnifying lens 12 is in the form of an achromat, for example, having a focal distance of three inches, and is supported from the sight tube 11 in front of an entrance pupil 15 provided at the lower end of the sight tube. The other end of sight tube 11 is closed by a wall having an exit pupil 16 therein, and the pupils 15 and 16 cooperate to define the angle of the line of sight, that is, the field of view. In one example of the device illustrated on FIG. 4, the tube 11 has a length of approximately six inches, and the diameters of the entrance and exit pupils 15 and 16 are respectively three-eighths inch and one-quarter inch.

Figure 5:
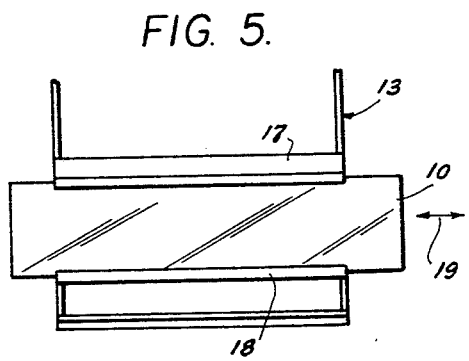
FIG. 5 is an enlarged fragmentary view of a portion of the device shown on FIG. 4, as viewed in the direction of the arrows 5—5 on that view.

The target member 10, which is of strip-like form, is laterally slidable in channel guides 17 and 18 (FIGS. 4 and 5) extending across support 13 and being suitably positioned to dispose the target member 10 at the desired angle to the surface S, as described above. It will be apparent that, by laterally sliding target member 10 in the direction of the arrows 19 on FIG. 5, it is possible to select the target or group of lines on member 10 which is disposed in a viewing position, that is, which is disposed so that its reflected image is in the line of sight L.

Since the sight tube 11 is disposed perpendicular to the surface S in FIG. 4, rather than being aligned with the reflected portion of the line of sight, the device illustrated on FIG. 4 further comprises a front surface plano-mirror 19 which is mounted in the support 13 below sight tube 11 and disposed at a suitable angle to reflect or angle the light rays into the axis of light tube 11 after such light rays have been reflected by the surface S within the field of view, that is, the area of the surface which is being inspected or measured.

In order to increase the visibility of the images of the target formed by reflection onto the surface S, the target at the viewing position is illuminated, preferably from the back or side thereof facing away from the surface S. Such back illumination is made possible by forming target member 10 of translucent or light transmitting material having the spaced lines of the several targets printed or otherwise applied thereto. In the device shown on FIG. 4, back illumination of the target disposed at the viewing position is effected by a small focusing type flashlight 20 which may be powered by batteries 21 and which is suitably supported in a bracket or arm 22 extending from support 13 to cast a beam of light against the portion of target member 10 at the viewing position.

It will be apparent that the device illustrated on FIG. 4, when operated as described above, makes it possible to measure the roughness of the surface S at an area of the latter within the field of view and which is of substantial extent, and that the device may be conveniently moved to various positions over the surface S for determining variations of the surface roughness between such positions.

In order to ensure that uniform conditions exist for the viewing of the reflected images of the several targets, each of the targets on a target member 10 is arranged at the same distance $d$ (FIG. 2) from the lower or base edge of the target member and, where the targets are provided on several target members, all of the targets are at that same uniform distance $d$ from the base edges of the respective target members. Where the targets range from 0.25 line per millimeter to twenty lines per millimeter, which range has been found to be suitable for the measurement of most surfaces, it is feasible to provide the necessary targets on three or four target members or slides which are interchangeably inserted in the guides 17 and 18 of support 13.

Figure 6:
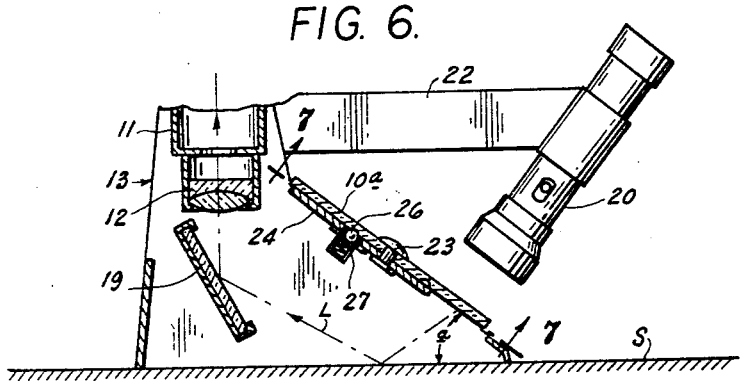
FIG. 6 is a fragmentary vertical sectional view similar to the lower portion of FIG. 4, but showing another embodiment of this invention.
Figure 7:
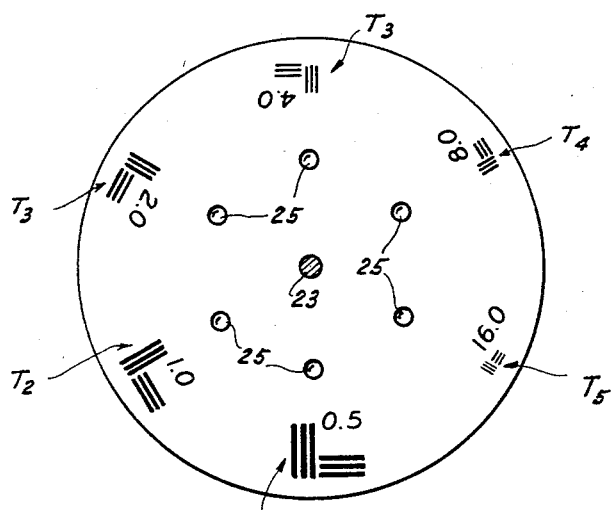
FIG. 7 is an enlarged sectional view taken along the line 7—7 on FIG. 6, and showing the target member included in that embodiment of the invention.

Alternatively, as shown on FIGS. 6 and 7, a target member 10a may be provided in the form of a disk of translucent or light transmitting material having all of the necessary targets, for example, the targets $T_1$–$T_5$ (FIG. 7), printed thereon at angularly spaced locations and disposed a uniform distance from the periphery of the disk. The disk-shaped target member 10a is rotatably mounted at its center, for example, on a pin 23 carried by a cross member 24 of support 13, so as to be turnable in a plane extending at the desired angle $a$ with respect to the surface S. Further, the axis of rotation of target member 10a is disposed so that its peripheral portion on which the several targets are printed passes through the line of sight L upon rotation of the target member. Thus, target member 10a can be turned to select any of its targets $T_1$–$T_5$ for viewing by reflection onto the surface S.

In order to releasably hold target member 10a in any of its positions where a target is in the line of sight, the arrangement of FIGS. 6 and 7 further preferably includes detent means which, as shown, may consist of suitably spaced recesses 25 formed in the underside of target member 10a (FIG. 7) and a spring urged ball 26 movable in a housing 27 carried by cross member 24 and being adapted to engage selectively in the recesses 25.

As previously mentioned, the preferred pattern of lines in each target includes lines extending at right angles to each other, as shown on FIG. 2, but it is to be noted that other patterns of lines, for example, concentric circular lines, may be employed in the targets to be viewed by reflection onto the surface S for measuring the roughness of the latter. However, the preferred patterns of lines arranged parallel to the plane of incidence and at right angles thereto makes it possible to ascertain the nature of the finish imparted to the surface being examined as well as the roughness thereof. Thus, where the surface being measured has been lapped, it will be found that the resolving power is the same for the lines of each target extending at right angles to each other. However, if the surface being measured has been generated by a cutting tool leaving tool marks on the surface, the resolution of the lines of each target extending in one direction will be different from the resolution of the lines at right angles to that direction. The difference between the resolving power with respect to the orthogonally related lines of each target is indicative of the direction of the tool marks on the surface and also of the depth thereof.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. A method of measuring the roughness of a surface which comprises viewing, along a fixed line of sight, images successively formed by reflection onto the surface to be measured, at an angle of incidence greater than 45°, of targets having spaced lines which are respectively of different size, thickness and spacing having correspondence to varying degrees of surface roughness, and selecting that target having the smallest, thinnest and closest lines that can be clearly resolved as an image formed by reflection onto said surface, which selected target indicates the roughness of the surface being measured.

2. The method as in claim 1; wherein each target has said lines thereof arranged in groups at right angles to each other so that the relative clarity of the groups of lines in the image thereof is an indication of the nature of the finish of the surface.

3. The method as in claim 1;
    wherein the images are viewed through a magnifying lens, and each target is held at an angle to the surface being measured which is smaller than said angle of incidence.

4. A method of measuring the roughness of a surface which comprises viewing, along a fixed line of sight, images successively formed by reflection onto the surface to be measured, at an angle of incidence between approximately 50° and 75°, of targets consisting of National Bureau of Standards Resolving Power Charts respectively having different numbers of lines per unit dimension, so that the chart having the greatest number of lines per unit dimension which can be clearly resolved in an image formed by reflection onto said surface to be measured is an indication of the root mean square value of the roughness of the surface.

5. A device for measuring the roughness of a surface comprising a plurality of groups of differently spaced lines of different thicknesses provided on at least one planar target member, support means adapted to hold said at least one target member adjacent the surface to be measured in a plane at an acute angle relative to the surface, and sighting means mounted on said support means and establishing a fixed line of sight of an image of a selected one of said groups of lines formed by reflection thereof onto the surface to be measured at an angle of incidence greater than 45°.

6. A device as in claim 5; wherein said at least one target member has a plurality of said groups of said lines thereon; and
  wherein said target member is movable in said plane relative to said support means so as to selectively bring the reflected images of said groups of lines into said fixed line of sight.

7. A device as in claim 6;
  wherein said target member is of strip-like form and has said groups of lines arranged at locations spaced apart therealong, and said support means has laterally extending, parallel guides slidably receiving said strip-like target member to permit the movement of the latter in said plane at an acute angle to the surface to be measured.

8. A device as in claim 6;
  wherein said target member is circular and has said groups of lines spaced therearound at equal distances from the periphery of the circular target member, and said support means includes means rotatably mounting said circular target member at the center of the latter to permit the movement of said target member in said plane at an acute angle to the surface to be measured.

9. A device as in claim 5;
  wherein said sighting means includes magnifying lens means to substantially increase the resolving power of the human eye, and said acute angle between said plane of the target member and the surface to be measured is less than said angle of incidence.

10. A device as in claim 5;
  wherein said sighting means includes a sight tube carried by said support means so as to extend at right angles to the surface to be measured for convenient viewing through said sight tube, and reflecting means carried by said support means between said sight tube and the surface to be measured to angle said line of sight from the surface to be measured into said sight tube.

No references cited.

JEWELL H. PEDERSEN, *Primary Examiner.*

O. B. CHEW, *Assistant Examiner.*